US009100701B2

(12) United States Patent
Wang (10) Patent No.: US 9,100,701 B2
(45) Date of Patent: Aug. 4, 2015

(54) ENHANCED VIDEO SYSTEMS AND METHODS (71) Applicant: TCL RESEARCH AMERICA INC., Santa Clara, CA (US)

(72) Inventor: Haohong Wang, Santa Clara, CA (US)

(73) Assignee: TCL RESEARCH AMERICA INC., Santa Clara, CA (US)

( * ) Notice: Subject to any disclaimer, the term of this patent is extended or adjusted under 35 U.S.C. 154(b) by 177 days.

(21) Appl. No.: 13/955,129

(22) Filed: Jul. 31, 2013

(65) Prior Publication Data

US 2015/0037009 A1 Feb. 5, 2015

(51) Int. Cl.
H04N 5/76 (2006.01)
H04N 21/466 (2011.01)

(52) U.S. Cl.
CPC .............. H04N 21/4667 (2013.01); H04N 5/76 (2013.01)

(58) Field of Classification Search
None
See application file for complete search history.

(56) References Cited

U.S. PATENT DOCUMENTS

| 2004/0041831 | A1* | 3/2004 | Zhang ........................... 345/723 |
| 2006/0251292 | A1* | 11/2006 | Gokturk et al. ............... 382/103 |
| 2009/0235312 | A1* | 9/2009 | Morad et al. ..................... 725/44 |
| 2011/0246560 | A1* | 10/2011 | Gibson .......................... 709/203 |
| 2011/0295694 | A1* | 12/2011 | Coggeshall et al. ........ 705/14.66 |
| 2012/0201472 | A1* | 8/2012 | Blanchflower et al. ........ 382/224 |
| 2014/0101293 | A1* | 4/2014 | Oh ................................. 709/219 |
| 2014/0201180 | A1* | 7/2014 | Fatourechi et al. ........... 707/706 |

FOREIGN PATENT DOCUMENTS

CN 102547480 A 7/2012

* cited by examiner

Primary Examiner — Hung Dang
Assistant Examiner — Sunghyoun Park
(74) Attorney, Agent, or Firm — Annova Law Group, PLLC (57) ABSTRACT

A method is provided for enhanced video services to at least one user. The method includes receiving a first input video, and processing the received input video to obtain multi-dimensional information associated with the input video. The method also includes obtaining user recommendation information based on user behavior, and creating enhanced video information based on the multi-dimensional information associated with the input video and the user recommendation information. Further, the method includes associating the enhanced video information with the first input video to create an enhanced video of the first input video, and playing back the enhanced video to the user.

19 Claims, 7 Drawing Sheets

ENHANCED VIDEO SYSTEMS AND METHODS

FIELD OF THE INVENTION

The present invention relates to the field of video technologies and, more particularly, to techniques for enhanced video playback and interaction systems.

BACKGROUND

Figure 1:
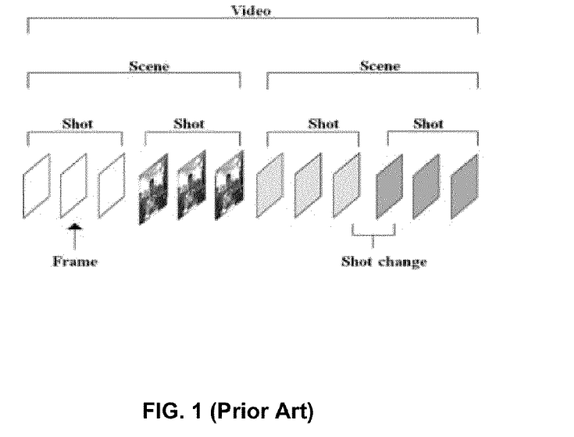
FIG. 1 shows an existing video processing method.

Video has become the main traffic of the Internet nowadays. However, the human interaction with video is still quite limited due to the complexity of video structure. FIG. 1 shows certain ways of processing video by existing technologies. As shown in FIG. 1, the video structure is divided into scenes, and then shots and then frames. The frame can be further divided into objects.

However, such video structure does not necessarily reflect other information of the video, such as the storyline structure of the title, which sometimes is more important than the video structure. Further, such video structure often lacks social aspects of the video and the viewer.

The disclosed methods and systems are directed to solve one or more problems set forth above and other problems.

BRIEF SUMMARY OF THE DISCLOSURE

One aspect of the present disclosure includes a method for enhanced video services to at least one user. The method includes receiving a first input video, and processing the received input video to obtain multi-dimensional information associated with the input video. The method also includes obtaining user recommendation information based on user behavior, and creating enhanced video information based on the multi-dimensional information associated with the input video and the user recommendation information. Further, the method includes associating the enhanced video information with the first input video to create an enhanced video of the first input video, and playing back the enhanced video to the user.

Another aspect of the present disclosure includes an enhanced video system for providing enhanced video services to at least one user. The enhanced video system includes an enhanced video processing module, a recommendation module, an enhanced video generator, and an enhanced video renderer. The enhanced video processing module is configured to receive a first input video and to process the received input video to obtain multi-dimensional information associated with the input video. The recommendation module is configured to obtain user recommendation information based on user behavior. Further, the enhanced video generator is configured to create enhanced video information based on the multi-dimensional information associated with the input video and the user recommendation information and to associate the enhanced video information with the first input video to create an enhanced video of the first input video. The enhanced video renderer is configured to playback the enhanced video to the user.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 2:
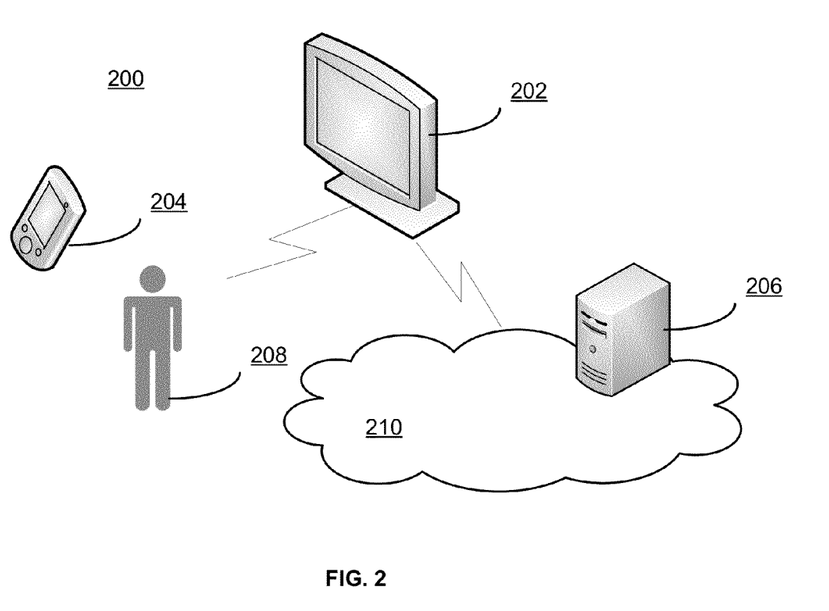
FIG. 2 illustrates an exemplary environment incorporating certain embodiments of the present invention.

FIG. 2 illustrates an exemplary environment 200 incorporating certain embodiments of the present invention. As shown in FIG. 2, environment 200 includes a television set (TV) 202, a terminal device 204, a server 206, a user 208, and a network 210. Other devices may also be included.

TV 202 may include any appropriate type of TV, such as plasma TV, LCD TV, projection TV, non-smart TV, or smart TV. TV 202 may also include other computing system, such as a personal computer (PC), a tablet or mobile computer, or a smart phone, etc. Further, TV 202 may be any appropriate content-presentation device capable of presenting multiple programs in one or more channels.

Terminal device 204 may include any appropriate type of terminals, such as a smart phone, a notebook computer, a tablet, a personal computer, or any type of wireless or wired terminal device.

Further, the server 206 may include any appropriate type of server computer or a plurality of server computers for providing enhanced video contents to the user 208. The server 206 may also facilitate the communication, data storage, and data processing for various components within the environment 200. TV 202, terminal device 204, and server 206 may communicate with each other through one or more communication networks 210, such as cable network, phone network, and/or satellite network, etc.

The user 208 may interact with TV 202 using a remote control to watch various programs and perform interactions with the various programs, or the user may simply use hand or body gestures to control TV 202 if motion sensor or depth-camera is used by TV 202. The user 208 may be a single user or a plurality of users, such as family members watching TV or other video programs together.

At the same time, the user may also access or interact with the terminal device 204 for same or different video programs on the TV 202. For example, environment 200 may support an N-screen configuration, where the user 208 may access multiple screens from a same device or different devices to view video programs or information related to the video programs. In other words, the TV 202 and the terminal device 204 are used for illustrative purposes only, any number of TVs, computers, or terminal devices may be used in the N-screen configuration, as long as the user 208 can access the multiple device to view, interact with, or switch among these devices.

Figure 3:
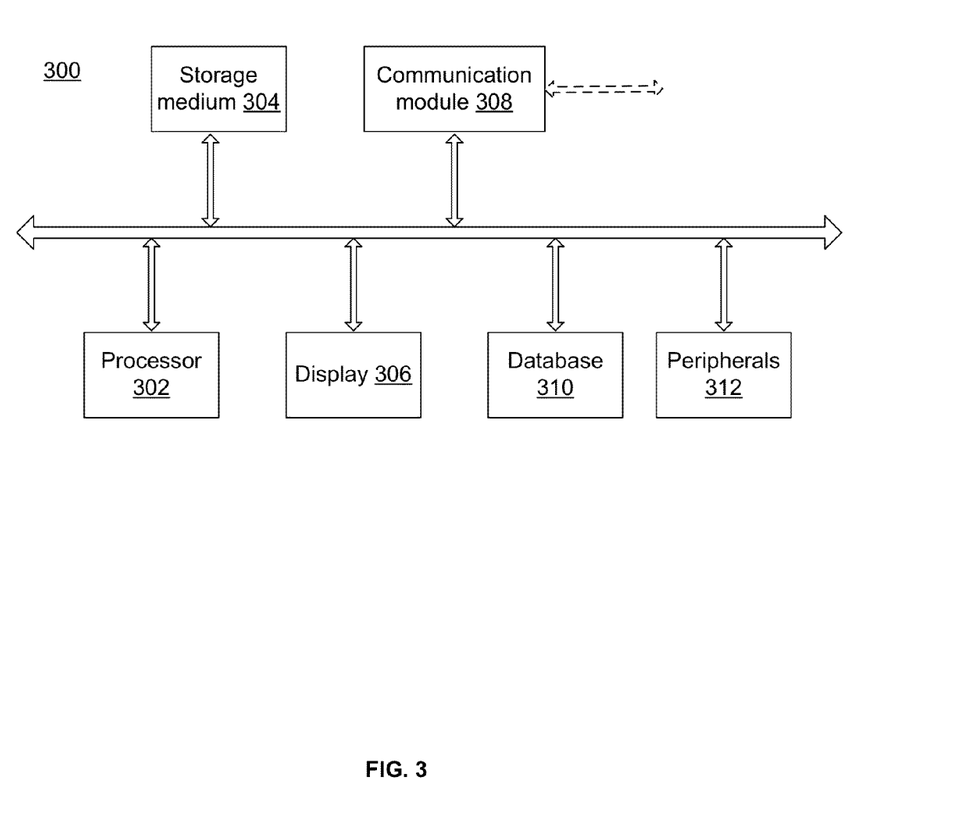
FIG. 3 illustrates an exemplary computing system consistent with the disclosed embodiments.

TV 202, terminal device 204, and/or server 206 may be implemented on any appropriate computing circuitry platform. FIG. 3 shows a block diagram of an exemplary computing system 300 capable of implementing TV 202, terminal device 204, and/or server 206.

As shown in FIG. 3, computing system 300 may include a processor 302, a storage medium 304, a display 306, a communication module 308, a database 310, and peripherals 312. Certain devices may be omitted and other devices may be included.

Processor 302 may include any appropriate processor or processors. Further, processor 302 can include multiple cores for multi-thread or parallel processing. Storage medium 304 may include memory modules, such as ROM, RAM, flash memory modules, and mass storages, such as CD-ROM and hard disk, etc. Storage medium 304 may store computer programs for implementing various processes, when the computer programs are executed by processor 302.

Further, peripherals 312 may include various sensors and other I/O devices, such as keyboard and mouse, and communication module 308 may include certain network interface devices for establishing connections through communication networks. Database 310 may include one or more databases for storing certain data and for performing certain operations on the stored data, such as database searching.

Figure 4:
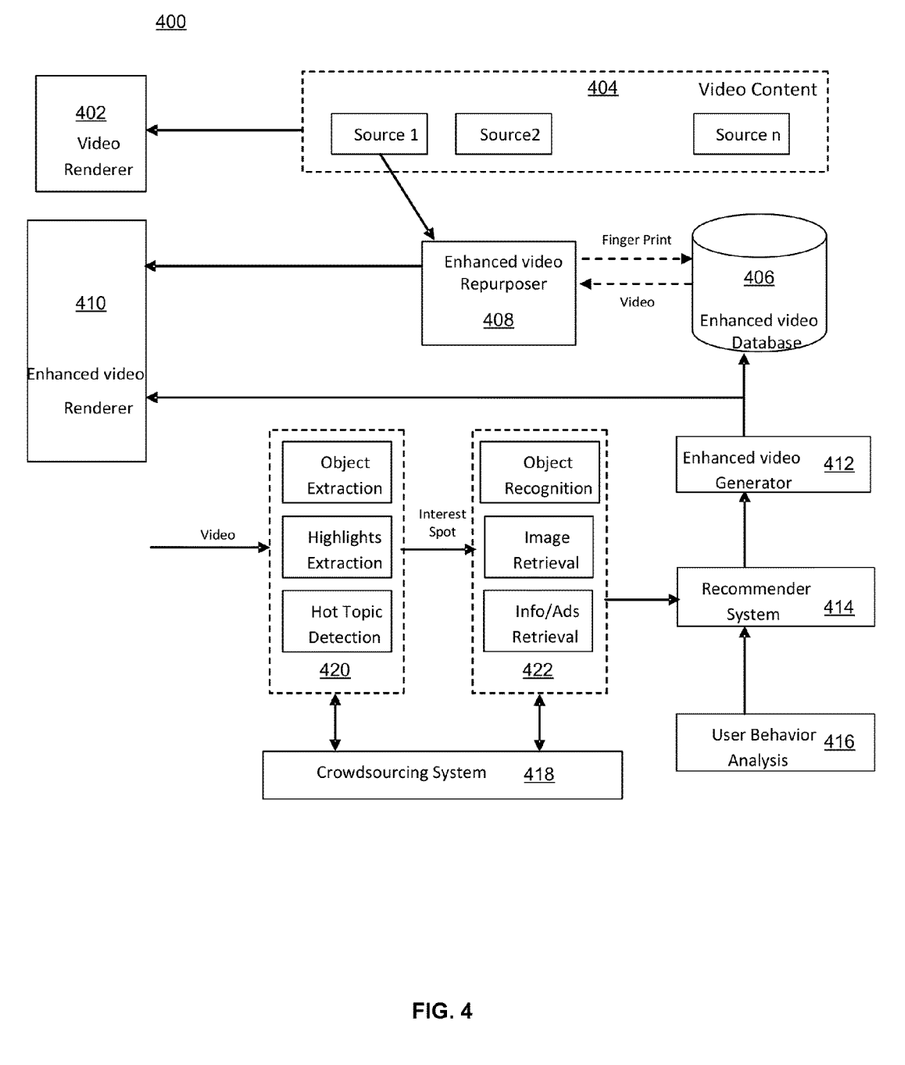
FIG. 4 illustrates an exemplary enhanced video system consistent with the disclosed embodiments.

TV 202, terminal device 204, and/or server 206 may implement an enhanced video system for personalized video services to user 208. FIG. 4 illustrates an exemplary enhanced video system 400 consistent with the disclosed embodiments.

As shown in FIG. 4, the enhanced video system 400 includes a video renderer 402, a video content database 404, an enhanced video database 406, an enhanced video repurposer 408, an enhanced video renderer 410, an enhanced video generator 412, a recommender system 414, a user behavior analysis module 416, a crowdsourcing system 418, an extraction and detection module 420, and a recognition and retrieval module 422. Certain components may be omitted and other components may be added.

A video input is provided to the enhanced video system 400 from any appropriate type of video source. The extraction and detection module 420 includes certain circuitry to process the input video bit-stream automatically. For example, the extraction and detection module 420 may include an object extraction module to perform objection extraction on the input video; a highlights extraction module to perform highlights extraction on the input video; and a hot-topic detection module to discover the interest spots for the users.

Further, the recognition and retrieval module 422 includes certain circuitry to process the information provided by the extraction and detection module 420. For example, the recognition and retrieval module 422 may include an object recognition module, an image retrieval module, and an information/advertisement retrieval module to perform object recognition and image/info/ads retrievals to find out the closest match for the visual object or hot topics. The extraction and detection module 420 and the recognition and retrieval module 422 may be together referred to an enhanced video processing module for receiving the input video and obtaining the multi-dimensional information about the input video.

To increase the system accuracy, the crowdsourcing system 418 is provided to add quality assurance (QA) efforts into the detected/recognized interest spots. Further, the user behavior analysis module 416 may monitor the user's interactions, detect the user's mood, and evaluate the user's behavior pattern (e.g., use pattern on the remote control, use pattern on the Internet or viewing video programs), such that the relationships between user's behavior and his/her preferences may be determined. The user analysis results of the user behavior analysis module 416 may be outputted to other modules or units, such as the recommender system 414.

The recommender system 414 may put together all relevant and personalized recommendation information aligned with the interest spots. Further, the enhanced video generator 412 creates an enhanced video corresponding to the input video by associating the above additional information (i.e., the enhanced video information) with the input video. The enhanced video, as used herein, refers to a scheme of interactive video format that enables users to interact with the video along multiple different dimensions or aspects. For example, the enhanced video may allow user interaction along three dimensions of object-level, story-line level, and social level. The social level interaction by users and the users' friends and family members can enrich the video into a more memorable personal experience. That is, the enhanced video allows the user to access, control, and/or adjust objects in the input video, the story-line of the input video, and personal and commercial aspects associated with the input video.

The enhanced video can be played back via the enhanced video renderer 410, which can also handle all scenario display settings including n-screen settings. The generated enhanced video can also be stored in the enhanced video database 406.

Further, the stored enhanced video database may be used by enhanced video system 400 to further enhance other similar input videos. More particularly, the video content module 404 may have or receive videos from various sources (i.e., Source 1, Source 2, . . . . Source n). The video renderer 402 may playback the input video from the video content module 404.

Further, for an input video, the enhanced video repurposer 408 may be provided to detect whether a corresponding enhanced video has already been created and stored in the enhanced video database 406 that matches to the input video. Any appropriate matching criteria may be used. For example, a matching is detected when similarity between the video part of the enhanced video and the input video may exceed a preset threshold. Or some type of fingerprint comparison of the two videos may be performed. Further, matching may be performed sequentially for the two videos to generate the corresponding enhanced video information from the existing enhanced video.

After a matching is found, the enhanced video repurposer 408 may associate the matching enhanced video information with the input video to create the enhanced video and send the created enhanced video to the enhanced video renderer 410 to playback the input video with the enhanced video information, i.e., the enhanced input video.

Figure 5:
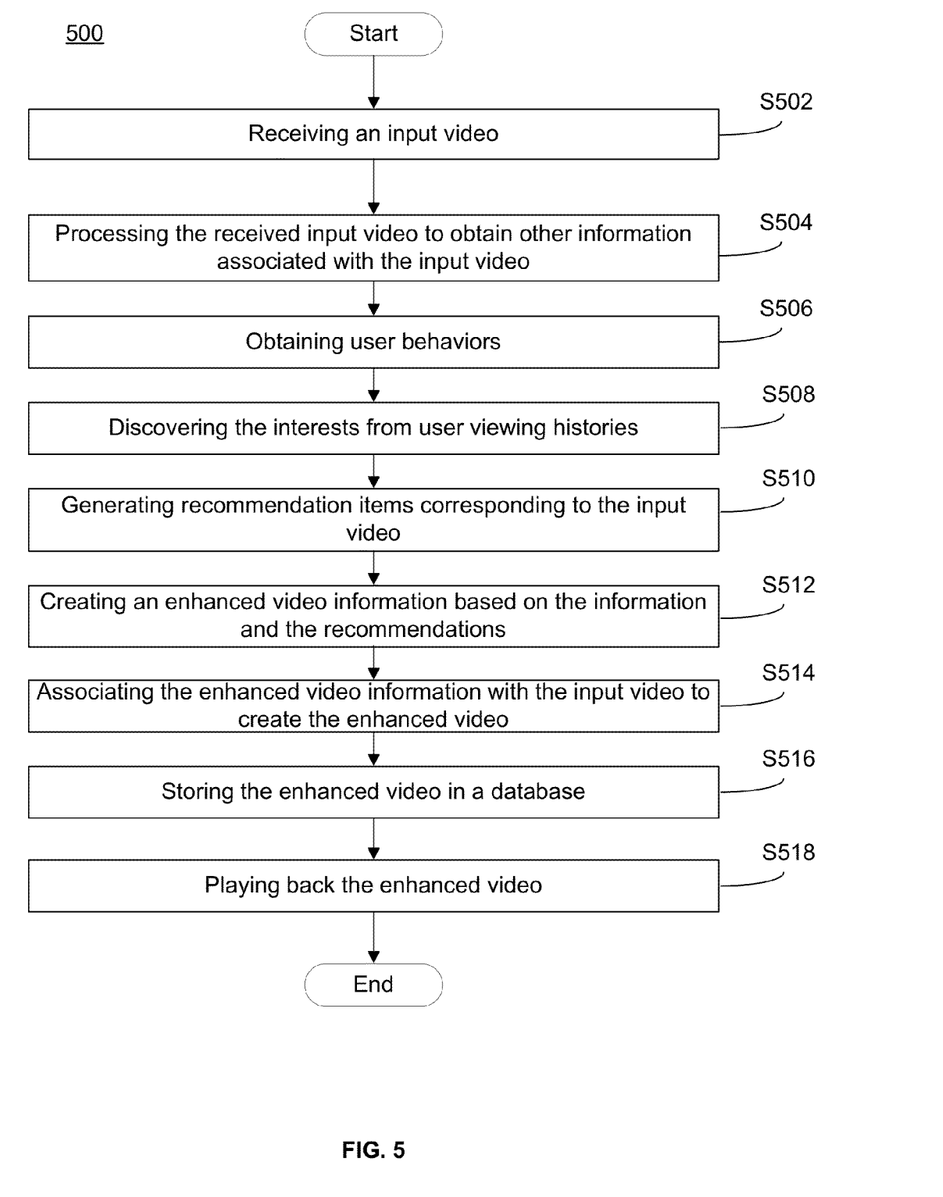
FIG. 5 illustrates an exemplary enhanced video creation process consistent with the disclosed embodiments.

In operation, the enhanced video system 400 (e.g., the various component, the processor 302, etc.) may perform certain processes to provide enhanced video services to the user. FIG. 5 illustrates an exemplary enhanced video generation process 500.

As shown in FIG. 5, at the beginning, an input video may be provided to the enhanced video system 400 (S502). The enhanced video system 400 (e.g., extraction and detection module 420) may process the received input video to obtain object information associated with the input video (S504). More specifically, the enhanced video system 400 may perform object detection on the input video to detect popular objects, such as human face, car, bag, cloth and so on by using different trained models representing various categories.

Further, the system 400 may perform object recognition on the input video to recognize the detected object. If the system 400 recognizes the detected object, a universal resource locator (URL) is associated to the object with other related information to accommodate typical user's need or request for this item such as search, recommend, or purchase. If the system 400 does not recognize the detected object, the system 400 may use the image retrieval engine to find similar objects in a database or from the Internet. In addition, the system 400 may also use the advertisement retrieval engine to link relevant advertisement with the detected object via keywords matching, etc.

Further, the system 400 (e.g., the highlights extraction module) may extracted video highlights, which are a set of video segments that preferred or interested by the user, i.e., the salient moments of a video. These highlights may be revisited by the user even after watching the input video. The video highlights may represent a story line of the input video.

The system 400 (e.g., the hot topic detection module) may also extract hot topics, i.e., keynotes reflecting certain topics from the subtitle of the video. If the subtitle of the video is not available, an optical character recognition (OCR) process may be performed to extract embedded subtitles from image sequence of the input video, or a speech detection and speech-to-text conversion may be performed to obtain the subtitle.

After the subtitle is obtained, a natural language processing (NLP) may be performed to break sentences into words, and then the words are filtered with a template to sift out the keywords, and the keywords are sent into Wikis or other information retrieval engine to compare their social hotness or social reputation, i.e., whether a keyword is discussed or widely used in the social network environment or whether there are Wiki pages created for this keyword. Finally, the ones with highest ranks are selected as hot topics. The system 400 also obtains associated URL from the information retrieval engine.

At the same time, the system 400 may also obtain the user behaviors (S506). The user behaviors may include logical operation (e.g., zapping, inter-page navigation), and physical operation (e.g., pressing buttons, swinging remote), etc. The user behaviors may reflect certain user preference and/or interest to be considered when generating the enhanced video information.

Additionally or optionally, the system 400 may use a crowdsourcing mechanism (i.e., submitting an open question to any web users such that certain users may answer the open question) to encourage the web volunteers to help with quality assurance of the enhanced video information that has been automatically generated as described above. Compensation may be provided in the crowdsourcing system to motivate the volunteers for their contribution.

Based on all or part of the obtained information, such as the objects, the keywords, the highlights, the hot topics, and the user's interest and preference, the system 400 may recommend more items for the user on the input video (S510). Afterwards, the system 400 generates the enhanced video information on the input video. The enhanced video information may include all or part of the above described information, such as the objects, the keywords, the highlights, the hot topics, and the user's interest and preference, as well as the recommendation items for advertisement, purchase, search, and/or social interactions (S512). That is, the enhanced video information may include multiple dimensions of information related to the input video, at the object-level, at the story-line level, and/or at the social level.

Afterwards, the system 400 may associate the enhanced video information with the input video to generate the enhanced video of the input video (S514).

Provided that the video sequences of the input video are denoted by $V=\{F_1, F_2, \ldots, F_n\}$, where that n is the total number of frames, the corresponding enhanced video can be represented by $\{V, R\}$, where the enhanced video information $R=\{R_1, R_2, \ldots, R_n\}$, where each $R_i$ can be represented as a list of some or all of the followings:

Object Type, Object bounding box $\{Lx, Ly, Rx, Ry\}$, URL
Keyword, URL
Part of Highlight frames
Hot topics
Recommended items Thus, the enhanced video is a superset of the input video, including additional information which enables direct interaction on top of the input video by adding layers of associated information on top of the video layer without changing the bit-stream of the input video. The information layers can be stored together with the input video or even in a separate file that mapping to the video bit-stream. In other words, the enhanced video information and the input video may be stored separately, and/or may be played back in separate data streams.

Further, because the information layers are not limited by any particular input video or any particular user, and are flexible to include different levels of amount of information, the information layers are also scalable. The scalability of the information layers are in at least following aspects.

Personal interest scalability: for personalization purpose, the priorities of various information are different for different user(s), thus the system can transmit only the interesting information to the viewers when network bandwidth is limited. Further, based on the levels of user interest, the information may be organized in the progressive order so that a personal interest scalability can be achieved.

Time effective scalability: from the enhanced video's creation point of view, some information may come from the automatic process, while others may come via post-production. Thus, time-sensitive information might be timely added or removed, or even change across the timeline.

Commercial value scalability: as the name indicates, the information can be arranged in priority order of commercial value.

During the recommendation process, the time-effective and commercial value are also considered in the order of recommended items, so that the scalability can be achieved as long as the data order organization are based on progressive manner.

Further, after the enhanced video is generated, the system 400 may store the enhanced video in a database (S516). The system 400 may also play back the enhanced video to the user (S518). The system 400 may use various ways to play back the enhanced video to the user. Because the enhanced video include the actual video and the enhanced video information, the system 400 may determine a particular way to present the video and the enhanced video information based on the user configuration or a default configuration, if the user does not choose or have a preference.

For example, the system 400 may play the video on a TV screen, while display the corresponding enhanced video information on a separate screen, such as a mobile terminal screen. That is, a so-called multi-screen playback. Or the system 400 may play the video and display the enhanced video information on the same screen in a picture-in-picture mode or an overlapping mode. Other display formats may also be used.

Further, the system 400 may present the video and the enhanced video information to the user separately in time. For example, the system 400 may play the video to the user first, and then display the enhanced video information to the user; or may display the enhanced video information to the user first and then play the video. Any appropriate methods may be used.

Figure 6:
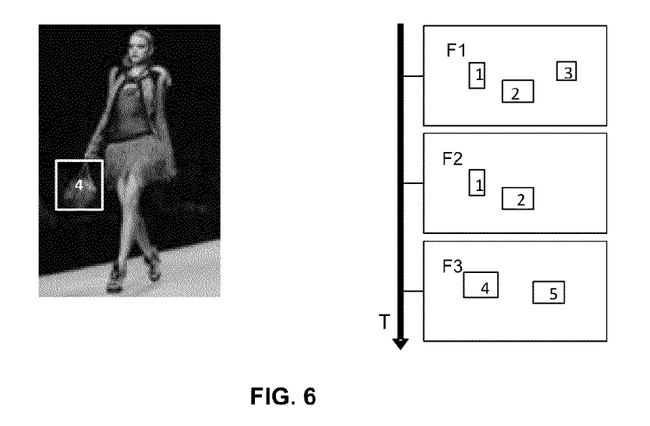
FIG. 6 illustrates an exemplary enhanced video use scenario consistent with the disclosed embodiments.

The playback may also be interactive, during which the user may interact with the system 400 at the object-level, at the story-line level, and/or at the social level. FIG. 6 illustrates an enhanced video use scenario.

As shown in FIG. 6, the input video is a scene of a model carrying a bag on the left figure, the enhanced video consists of 3 consecutive frames (F1, F2, F3) along the timeline, and each frame contains of objects and relevant information, context information reflecting the storyline structure, social comments, and fingerprint information (e.g., in small box with labels).

The enhanced video is created by an automatic process, although refined results can be obtained with human intervention. The automatic process may use the above described methods, such as visual semantic object extraction, video highlights extraction, keywords and hot topics detection, human behavior analysis, image and object retrieval, news and information retrieval, and personalized recommendation, etc., to create the enhanced video.

Figure 7:
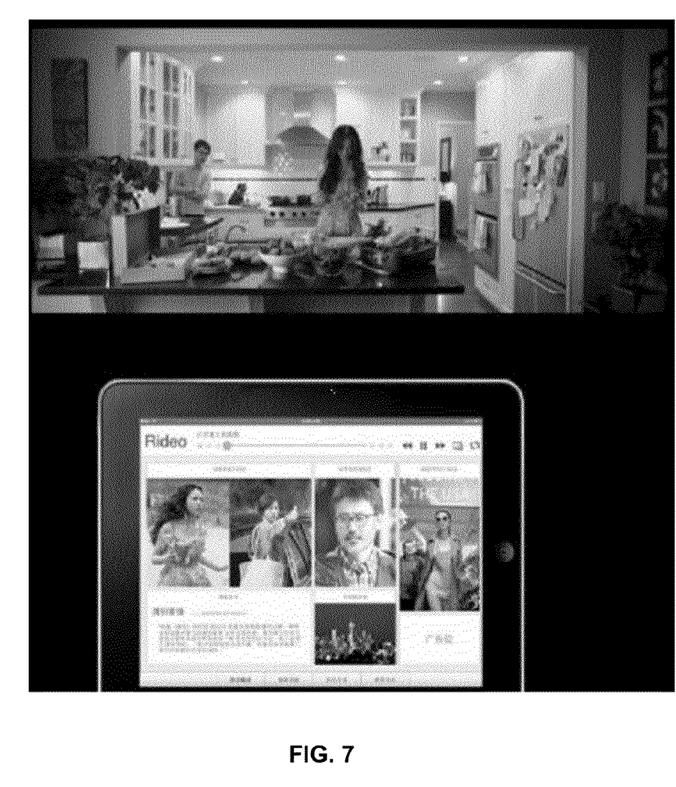
FIG. 7 illustrates another exemplary enhanced video use scenario consistent with the disclosed embodiments.

FIG. 7 illustrates an enhanced video playback scenario. As shown in FIG. 7, a multi-screen playback method is used. The video program is shown on TV and, on the other hand, the information layers of the enhanced video information are rendered on the mobile device that is synchronized with the program shown on the TV.

Figure 8:
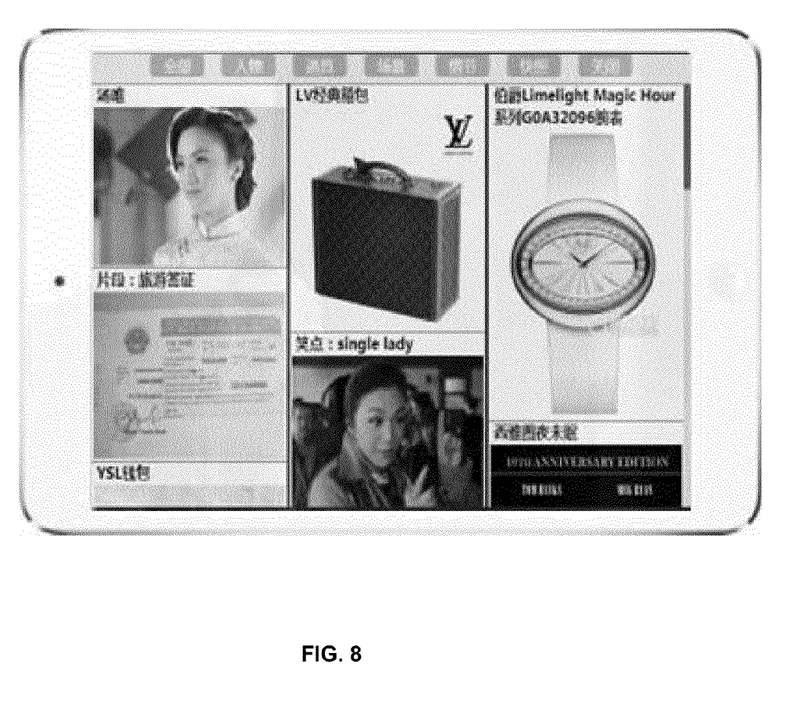
FIG. 8 illustrates another exemplary enhanced video use scenario consistent with the disclosed embodiments.

FIG. 8 illustrates another enhanced video playback scenario. As shown in FIG. 8, a mobile device to used to access the enhanced video information (with a list of object/information) after the video playback is over. In both cases, the enhanced video information rendered provides the user opportunities to direct interact with objects in the video to seek for information, purchase, or socialization, etc.

Figure 9:
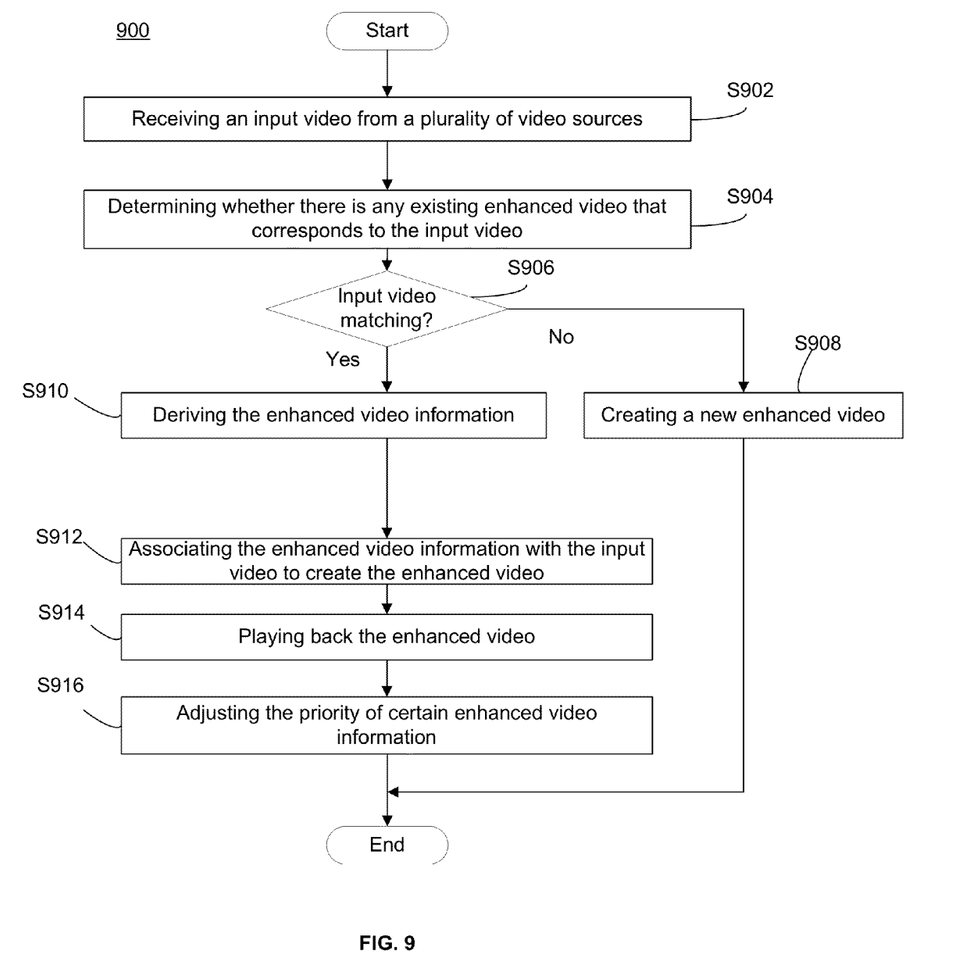
FIG. 9 illustrates an exemplary enhanced video operation process consistent with the disclosed embodiments.

After the enhanced video information is created, the system 400 may use the available enhanced video information for other similar videos. FIG. 9 illustrates an exemplary enhanced video operation process consistent with the disclosed embodiments.

As shown in FIG. 9, the system 400 may receive an input video from a plurality of video sources (S902). After receiving the input video, the system 400 may determine whether there is any existing enhanced video that corresponds to the input video (S904).

Content may have multiple variations or copies to be rendered in various displays. For example, a video title may be presented in many different formats, e.g., a blurred or low-quality version that someone recorded, in which the resolution maybe even not the same, or a version that inserted advertisement in the middle and removed some frames for various reasons, etc. However, the system 400 may perform the enhanced video creation process only once and then deploy automatically onto all copies/variations and adaptive to all displays, i.e., enhanced video repurposing. In other words, using the enhanced video repurposing mechanism, a set of variations of the existing enhanced video can be automatically derived in real time to match with the copies/variations of the existing video and with the various playback conditions, instead of creating enhanced video for each copy and each scenario.

That is, the enhanced video repurposing is used to synchronize an enhanced video with a variation of the video stream contained in the enhanced video. In operation, the system 400 may first perform a video copy detection to determine whether the input video is a copy of the existing enhanced video, i.e., a copy video.

If the input video is not a copy of the existing video, the system 400 may create an enhanced video for the input video, and the process completes. On the other hand, if the input video is a copy of the existing video, the system 400 may further match the input video with the enhanced video so that the enhanced video information can be reused to cover the copy video with correct timestamp correspondence, etc.

More specifically, a TIRI-DCT based Needleman-Wunsch algorithm may be used to find timestamp correspondence between the existing video and the copy video. Here, the enhanced video is denoted by $A=a_1 a_2 \ldots a_m$, and the copy video is denoted by $B=b_1 b_2 \ldots b_n$, where $a_i$ (1=1, ..., m) and $b_j$ (j=1, ... n) are the spatial-temporal fingerprint of each video frames. The image similarity between video frames is calculated based on the similarity between fingerprints. Also, partial segments are defined as, $A_i$ and $B_j$, as to consist of the first i and j elements of A and B, respectively, i.e., $A_i=a_1 a_2 \ldots a_i$ and $B_j=b_1 b_2 \ldots b_j$ ($1 \le i \le n$ and $1 \le j \le n$); and define $S(i, j)$ as the maximum score among all alignments of $A_i$ and $B_j$.

The dynamic programming algorithm to align A and B is as follows:

Initialization:
$0^{th}$ row of $S(i, j)$: $S(0, j)=d \times j$, $j=0, 1, 2, \ldots, n$
$0^{th}$ column of $S(i, j)$: $S(i, 0)=d \times i$, $i=1, 2, \ldots, n$
Recursion (for $1 \le i \le n$ and $1 \le j \le n$):

$$S(i,j)=\max[S(i-1,j-1)+\text{Similarity}(a_i,b_j), S(i,j-1)+d, S(i-1,j)+d] \quad (1)$$

In the above description, d represents the similarity between a video frame and an empty frame (i.e., no video frame exists), which can be reasonability set as 0 or a negative value; and Similarity($a_i$, $b_j$) represents the similarity between fingerprint $a_i$ and $b_j$ (which equals to d when either $a_i$ or $b_j$ corresponds to empty frame), which is calculated by the Euclid distance between the two fingerprint vectors.

The fingerprint may be obtained via temporally informative representative image (TIRI)-DCT. First, a TIRI image is generated by interpolate the current frame with its neighboring frames (in time domain) with a bilateral filter, then the image is divided into overlapping blocks of size N*N, where N is the size of the block, and each block is processed with 2D-DCT. By putting the major DCT coefficients of each block into a vector, the fingerprint vector of the current frame can be obtained.

When the similarity between the enhanced video and the copy video is above a threshold, the system 400 may determine that the enhanced video and the copy video are matching (S906, Yes), and the process continues. On the other hand, if the input video does not match the existing enhanced video (S906, No), the system 400 may further create a new enhanced video corresponding to the input video (S908), and the process completes.

Once the corresponding match is obtained, the enhanced video information can be derived for the copy video by using the matched timestamp instead of the original timeframe for the information layers (S910). The derived enhanced video information is then associated with the input video to create the enhanced video of the input video (S912). This way, the enhanced video repurposer module can get copy video from one data source, and dynamically generate the associate enhanced video information layer, when the video and information layer are rendered in the same display, the enhanced video user experience can be achieved. Afterwards, the copy video and the associated enhanced video information are played back to the user (S914).

In addition, the system 400 may also adjust the priority of certain enhanced video information (S916). For example, the system 400 may push target-oriented information in higher priority based on the usage statistics as well as factors like commercial and user preferences.

By using the disclosed systems and methods, advantageous personalized content delivery and interaction applications may be implemented. The disclosed systems and methods provide a new enhanced video (Rich Video), a new scheme of video entertainment experience. During the enhanced video playback experience, the user can interact with the content to seek for information, complete purchase transaction, and obtain service experience. On the other hand, the enhanced video learns user's preference according to the interaction, and then provides personalized services for the user. Thus, an automatic process for enhanced video creation, deployment, and adaptation can be utilized in a heterogeneous network and endpoint condition utilizing enhanced video repurposing technology. For many versions of a video content, the enhanced video creation process is needed only once, then the repurposing technology takes over the task of converting this created enhanced video to adapt for other versions of the same video content.

The disclosed systems and methods can also be extended to other devices with displays, such as cell phones, tablets, PCs, watches, and so on, to enable a unique user interaction experience. Other applications, advantages, alternations, modifications, or equivalents to the disclosed embodiments are obvious to those skilled in the art.

What is claimed is:

1. A method for enhanced video services to at least one user, comprising:
    receiving a first input video;
    processing the received first input video to obtain multi-dimensional information associated with the first input video;
    obtaining user recommendation information based on user behavior;
    creating enhanced video information based on the multi-dimensional information associated with the first input video and the user recommendation information;
    associating the enhanced video information with the first input video to create an enhanced video of the first input video;
    playing back the enhanced video of the first input video to a user;
    receiving a second input video from a plurality of video sources;
    determining whether the second input video matches with the first input video, which already has the enhanced video previously created;
    when it is determined that the second input video matches with the first input video, deriving enhanced video information for the second input video from the enhanced video of the first input video;
    associating the derived enhanced video information with the second input video to create an enhanced video for the second input video; and
    playing back the enhanced video of the second input video to a user.

2. The method according to claim 1, wherein:
    the multi-dimensional information includes information of objects in the first input video, a story-line of the first input video, and social aspects of the first input video.

3. The method according to claim 1, wherein processing the first input video further includes:
    performing an object extraction on the first input video to detect an object from the first input video;
    performing object recognition on the detected object;
    when the detected object is recognized, associating a universal resource locator (URL) with the recognized object with other related information to accommodate a typical user's need for the recognized object, including search information, recommendation information, and purchase information; and
    when the detected object is not recognized, retrieving similar objects from the Internet together with the URL and other related information.

4. The method according to claim 3, further including:
    extracting video highlights of the first input video to representing a story-line of the first input video.

5. The method according to claim 4, further including:
    extracting topics of the first input video in terms of keywords;
    sending the keywords to an information retrieval engine to compare social hotness or social reputation; and
    selecting keywords with highest ranks as hot topics of the first input video.

6. The method according to claim 5, wherein extracting topics of the first input video further includes:
    when the first input video has a subtitle, extracting keywords of the first input video from the subtitle of the first input video; and
    when the first input video does not have a subtitle, performing an optical character recognition (OCR) process to extract an embedded subtitle of the first input video and extracting keywords of the first input video from the subtitle of the first input video.

7. The method according to claim 1, wherein creating enhanced video information further includes:
    organizing the enhanced video information in a progressive order such that personal interest scalability is achieved; and
    considering time-effectiveness and commercial value in a progressive order of recommended items, such that time-effective scalability and commercial value scalability are achieved.

8. The method according to claim 1, wherein playing back the enhanced video of the first input video to the user further includes:
    playing the first input video on a first screen; and
    displaying the enhanced video information on a second screen, different from the first screen, and in synchronization with the first input video.

9. The method according to claim 1, wherein playing back the enhanced video of the first input video to the user further includes:
    playing the first input video on a screen; and
    displaying the enhanced video information on the screen after playing the first input video.

10. The method according to claim 1, further including:
    when it is determined that the second input video does not match with the first input video, creating a new enhanced video corresponding to the second input video.

11. The method according to claim 1, wherein determining whether the second input video matches with the first input video further includes:
    determining that the second input video is a copy of the first input video; and matching the second input video with the first input video based on fingerprints of the second input video and the first input video.

12. The method according to claim 11, wherein deriving the enhanced video information for the second input video from the enhanced video of the first input video further includes:

replacing a matched timestamp of video time-frames with an original timestamp in the enhanced video information of the first input video to derive the enhanced video information for the second input video from the enhanced video of the first input video.

13. An enhanced video system for providing enhanced video services to at least one user, comprising:

an enhanced video processing module configured to receive a first input video and to process the received input video to obtain multi-dimensional information associated with the first input video;

a recommendation module configured to obtain user recommendation information based on user behavior;

an enhanced video generator configured to create enhanced video information based on the multi-dimensional information associated with the first input video and the user recommendation information and to associate the enhanced video information with the first input video to create an enhanced video of the first input video;

an enhanced video renderer configured to playback the enhanced video to a user;

a video content module configured to receive a second input video from a plurality of video sources; and an enhanced video repurposer configured to:
determine whether the second input video matches with the first input video, which already has the enhanced video created previously;
when it is determined that the second input video matches with the first input video, deriving enhanced video information for the second input video from the enhanced video of the first input video; and
associate the derived enhanced video information with the second input video to create an enhanced video for the second input video.

14. The enhanced video system according to claim 13, wherein:

the multi-dimensional information includes information of objects in the first input video, a story-line of the first input video, and social aspects of the first input video.

15. The enhanced video system according to claim 13, wherein, to process the first input video, the enhanced video processing module is further configured to:

perform an object extraction on the first input video to detect an object from the first input video;

perform object recognition on the detected object;

when the detected object is recognized, associate a universal resource locator (URL) with the recognized object with other related information to accommodate a typical user's need for the recognized object, including search information, recommendation information, and purchase information; and when the detected object is not recognized, retrieve similar objects from the Internet together with the URL and other related information.

16. The enhanced video system according to claim 15, further including:

extracting video highlights of the first input video to representing a story-line of the first input video;

extracting topics of the first input video in terms of keywords;

sending the keywords to an information retrieval engine to compare social hotness or social reputation; and selecting keywords with highest ranks as hot topics of the first input video.

17. The enhanced video system according to claim 13, wherein the enhanced video repurposer is further configured to:

when it is determined that the second input video does not match with the first input video, create a new enhanced video corresponding to the second input video.

18. The enhanced video system according to claim 13, wherein, to determine whether the second input video matches with the first input video, the enhanced video repurposer is further configured to:

determine that the second input video is a copy of the first input video; and match the second input video with the first input video based on fingerprints of the second input video and the first input video.

19. The enhanced video system according to claim 18, wherein, to derive the enhanced video information for the second input video from the enhanced video of the first input video, the enhanced video repurposer is further configured to:

replace a matched timestamp of video time-frames with an original timestamp in the enhanced video information of the first input video to derive the enhanced video information for the second input video from the enhanced video of the first input video.

* * * * *